(12) United States Patent
Henningsen

(10) Patent No.: US 7,128,866 B1
(45) Date of Patent: Oct. 31, 2006

(54) RAPID PROTOTYPING APPARATUS AND METHOD OF RAPID PROTOTYPING

(75) Inventor: Henning Henningsen, Låsby (DK)

(73) Assignee: Dicon A/S (DK)

( * ) Notice: Subject to any disclaimer, the term of this patent is extended or adjusted under 35 U.S.C. 154(b) by 0 days.

(21) Appl. No.: 09/807,394

(22) PCT Filed: Oct. 12, 1999

(86) PCT No.: PCT/DK99/00549

§ 371 (c)(1),
(2), (4) Date: Apr. 12, 2001

(87) PCT Pub. No.: WO00/21735

PCT Pub. Date: Apr. 20, 2000

(30) Foreign Application Priority Data

Oct. 12, 1998 (DK) ................................ 1998 01298

(51) Int. Cl.
*B29C 35/08* (2006.01)

(52) U.S. Cl. ................... 264/401; 264/1.26; 264/1.36; 264/460; 264/463; 264/497; 425/174.4

(58) Field of Classification Search ................ 425/174, 425/174.4; 264/1.24, 1.26, 1.37, 1.38, 462, 264/461, 463, 485, 488, 492, 497, 1.36, 460, 264/401

See application file for complete search history.

(56) References Cited

U.S. PATENT DOCUMENTS

| 4,575,330 | A | | 3/1986 | Hull .......................... 425/174.4 |
| 4,801,477 | A | | 1/1989 | Fudim ........................ 425/54.1 |
| 4,859,034 | A | * | 8/1989 | Shiraishi et al. ......... 350/331 R |
| 4,929,402 | A | * | 5/1990 | Hull ............................. 264/22 |
| 5,394,254 | A | * | 2/1995 | Cheng ......................... 359/42 |
| 5,444,235 | A | * | 8/1995 | Redford ...................... 250/208 |
| 5,593,531 | A | * | 1/1997 | Penn ........................ 156/272.6 |
| 5,790,297 | A | * | 8/1998 | Berlin ......................... 359/259 |
| 6,051,179 | A | * | 4/2000 | Hagenau ..................... 264/401 |
| 6,296,383 | B1 | * | 10/2001 | Henningsen ................ 362/552 |

FOREIGN PATENT DOCUMENTS

| WO | WO 98/04950 | 5/1998 |
| WO | WO 98/47042 | 10/1998 |
| WO | WO 98/47048 | 10/1998 |

* cited by examiner

*Primary Examiner*—Joseph S. Del Sole
*Assistant Examiner*—Emmanuel S. Luk
(74) *Attorney, Agent, or Firm*—Cantor Colburn LLP

(57) ABSTRACT

The invention relates to a rapid prototyping apparatus for the manufacturing of three dimensional objects by additive treatment of cross sections comprising a wholly or partially light-sensitive material, said apparatus comprising at least one light source for illumination of a cross section of the light-sensitive material by at least one spatial light modulator of individually controllable light modulators, wherein at least one light source is optically coupled with a plurality of light guides arranged with respect to the spatial light modulator arrangement in such a manner that each light guide illuminates a sub-area of the cross section.

According to the invention, it is possible to obtain a significant simplification of an RP design system, just as the apparatuses designed are essentially capable of creating prototypes of any size, according to the invention.

21 Claims, 2 Drawing Sheets

RAPID PROTOTYPING APPARATUS AND METHOD OF RAPID PROTOTYPING

TECHNICAL FIELD

The invention relates to a so-called rapid prototyping apparatus for the manufacturing of three dimensional objects by additive treatment of cross sections, said cross sections consisting of a wholly or partially light-sensitive material, said rapid prototyping apparatus comprising at least one light source.

The invention also relates to a method of manufacturing of three dimensional objects by means of a rapid prototyping apparatus wherein a wholly or partially light-sensitive material is treated by means of illumination of a cross section of the material by at least one spatial light modulator arrangement of controllable light modulators.

BACKGROUND OF THE INVENTION

In connection with the manufacturing of mechanical prototypes, and especially during the production design processes, recent years have introduced various types of rapid prototyping techniques (RP) where three dimensional objects are manufactured by sequential cross section layers generated by a given illumination, sintering, setting or placing of material etc. on each cross section. The individual cross sections are e.g. generated as computer-aided designs. The advantage of RP is that the manufacturing of expensive molding tools for the design of the apparatus becomes superfluous for its manufacturing, just as difficult and time-consuming modifications of a molding tool may almost be completely avoided.

Also, various techniques have been made available for the manufacturing of relatively inexpensive and fast prototype or 0 series molding tools based on a manufactured Rapid Prototype.

One type of RP technique is used in e.g. stereolithographic apparatuses also called SLAs. This technique is based on the individual layers or cross sections of a prototype being manufactured by a photo-sensitive medium and hardened into one monolithic prototype by means of computer-aided illumination.

Apparatuses and techniques of the above-mentioned type are described in e.g. U.S. Pat. No. 4,575,330 where the illumination determined by the cross section is described as a laser drawing of each cross section or a transilluminating mask exposing the desired cross section.

Meanwhile, one of the disadvantages of the above-mentioned system is that the distribution of light over the cross section limits the design flexibility of the system as adjustments of existing sources of illumination are limited to certain system dimensions.

Thus, when manufacturing large-scale models, it is necessary to divide a given desired prototype into several prototype parts, manufacture these parts individually by separate runs and then finally complete the prototype by joining the parts by e.g. pasting.

However, this process involves a significant risk of running into technical problems and complications. It is necessary to take into account e.g. marginal problems for each prototype part as the tolerance level between adjacent prototype parts differs from the tolerance levels existing between each of the manufactured layers comprising the individual prototype parts. Meanwhile, this may be prevented by taking the proper precautions in relation to the illumination algorithms or by an actual mechanical manufacturing of the individual prototype parts if necessary. This compensation strategy would be particularly difficult on the "vertical level" and may e.g. lead to both under- and overillumination and consequently to tolerance or joining errors between the individual layers.

Problems could also arise in connection with the pasting of the prototype parts as the hardening of the paste may cause contractions or expansions in places where the paste is used. These changes in the hardening would often be of a non-linear character and thereby difficult to estimate or predict beforehand.

Another problem is that these joinings generally cause problems of strength when used on large-scale models.

An additional and significant problem is that common RPA materials (materials for Rapid Prototyping Apparatuses) such as acrylates and epoxy are quite hazardous making manual runs undesirable. In this connection, it should be mentioned that the joining of the individual prototypes must be carried out manually which adds to the costs and makes working conditions difficult. Also, due to the manual work to be carried out as described in accordance with the method above, the encapsulation of the apparatus makes it more difficult for the creators to carry out their work. This problem is even more outspoken in relation to the use of e.g. hazardous or directly toxic materials.

Finally, it should also be mentioned that the known method is quite time-consuming involving many hours and sometimes several days, depending on the size of the prototype.

EP 0 676 275 discloses a DMD-based stereolithographic device comprising a plurality of illumination modules, each module comprising a dedicated light source. By varying the number of the utilized modules, an arbitrary size and form of the illumination head may be obtained. However, the device has the disadvantage of being voluminous and quite expensive. Moreover, the mutual variation of the light sources results in a different degree of illumination of the various illuminated sub-areas, and consequently in both underexposure and overexposure of as well the vertical and horizontal plane of the illuminated surface.

The purpose of the invention is to create an RP technique and an RP apparatus that may be used for the manufacturing of e.g. large-scale prototypes while it is also the purpose of the invention to create a design system that may be applied in relation to the design of various types of RPA systems without requiring significant design modifications.

SUMMARY OF THE INVENTION

The invention relates to a rapid prototyping apparatus for the manufacturing of three dimensional objects by additive treatment of cross sections comprising a wholly or partially light-sensitive material, said apparatus comprising at least one light source for illumination of a cross section of the light-sensitive material by at least one spatial light modulator of individually controllable light modulators, wherein at least one light source being optically coupled with a plurality of light guides arranged with respect to the spatial light modulator arrangement in such a manner that each light guide illuminates a sub-area of the cross section.

The invention provides the opportunity to design a given RP system for handling prototypes of any size as the number of light emitters and thereby individual areas to be covered may be increased or decreased until it matches the size of the prototype in question. In this manner, it becomes possible and simple to design an illumination system for an RP system constructed as a module system having a number of illumination modules that may be suitably added or arranged in relation to the system design. This flexibility may in principle be utilized for both the design of RPs for large-scale prototypes and of more consumer-oriented RPs for small-scale models.

Also, the multiple light emitters provide the opportunity to use light sources in the shape of dots. By applying a system in accordance with the invention it is possible to obtain a diameter of the punctual point of illumination of as little as 10μ in comparison with the existing technique with an absolute low of 80μ. This is of great advantage when manufacturing prototypes where great precision properties are required. This includes e.g. the manufacturing of tools where the prototype is provided with a metal coat subsequent to the manufacturing prior to being used for the molding of a tool.

Certain areas of this technique apply a prolonged light source such as e.g. a fluorescent lamp or an excimer lamp in order to be able to produce prototypes of a certain dimension. However, according to the optical laws, prolonged light sources alone only provide the opportunity to create a prolonged point of illumination which, in turn, significantly limits the potential of making details in the prototype. Apart from that, prolonged light sources are subject to relatively large losses.

According to the invention, the definition of light is broad and includes electromagnetic radiation, both within and outside the visible spectrum.

Alternatively, quite a lot of optics must be used in connection with the prolonged light sources in order to adjust the shape of the point of illumination. Naturally, this makes the system more expensive while also requiring a great degree of accuracy when monitoring the optics.

The multiple light emitters also provide the opportunity to increase the illumination effect over the illuminated cross section since each area can be illuminated by an individual light emitter or even an illuminant. This is an advantage as it becomes possible to tailor the illumination effect to the individual prototype in such a manner that it is created with optimal illumination effect.

By illuminating the sub-areas it is possible to obtain an effective sum of the number of sub-areas.

A particular advantage of an illumination system according to the invention is also that the illumination of the sub-areas provides the opportunity to design sub-areas in separate illumination modules that may easily be replaced as the individual illumination modules may be mutually aligned.

This should be seen in the light of the fact that the illumination modules must be regarded as being fairly vulnerable in relation to various RP technologies, as the illumination system will be damaged permanently once it has been put in contact with certain kinds of media which is why the possibility to create a fairly easy method of replacement of the illumination shutters is desirable.

Also, several of the existing illumination technologies have a limited useful life. This includes the LCD-based light valves where the strong luminous excitation, especially with UV-light, results in a risk of a gradual breakdown of the active crystals, which is also the case with the micromechanical shutter, according to an embodiment of this invention, said micro mechanical shutters being expected to have a limited number of on/off shifts.

Treatment is defined in its broadest sense and includes e.g. hardening or decomposition of the light-sensitive material.

By letting each spatial modulator arrangement comprise transmissive light valves, it is possible to obtain an additional advantageous embodiment, according to the invention. By using light guides, the above-mentioned advantage of easy replacement of the illumination modules will be distinct as the mutual alignment of the illumination modules only requires a supplementary uncritical assembly or disassembly of the light-emitting end of a light source. Thus, no critical calibration of the illumination system is needed.

By distributing the light through several light guides, each illuminating a number of light valves, it is also possible to use more light sources in a simple manner as each light source may be dedicated to one particular light guide so that the effect is maximized.

Another advantage of distributing light by means of light guide is that the light may be suitably mixed in optical couplers or similar devices in order to obtain a greater total transmitted effect in the individual light guide.

Yet another advantage of the invention is that it gradually becomes possible to obtain increased power inputs from e.g. lamps in the UV-area resulting in the effect transmitted to the light valves being so great that the individual light guides may emit a light that has sufficient energy to illuminate more light valves simultaneously.

In connection with the use of e.g. UV lamps, it has also turned out that the introduction of "macro illumination areas", i.e. areas illuminated by one single optical fiber per area, does not result in any significant edge effects between each illumination area, just as it has turned out that potential and significant variations between the emitted effects from each light guide (resulting from a varying intensity profile of a connected lamp e.g. due to various placings of the coupling optics and the individual fibers in relation to the lamp) may be compensated for by a suitable mix of the light guides whereby the result of the illumination is a homogenous visual impression without any significant differences in intensity in the edge areas.

The above-mentioned mix may e.g. be carried out in relation to the adjacent macro illumination areas that may be provided with an optical effect which does not vary significantly while macro illumination areas situated relatively far from each other may vary in intensity without resulting in significant visual interruptions on the illumination surface.

An additional advantage, according to the invention, is that it is possible to filtrate light emitted to or from the individual optical fibers so that the illumination intensity is homogenous for all or a part of the optical fibers.

According to the invention, an apparatus like this may be based on a relatively simple technique compared to the existing techniques while also creating a high solution, high illumination speed, good precision properties and a uniform illumination intensity over a very large illumination area.

The invention is particularly advantageous in relation to light valves associated with a relatively great loss. An example of such light valves may e.g. be spatial light modulators such as LCD, PDLC, PLZT, FELCD and Kerr cells. Other types of light valves may e.g. be electromechanical reflection-based light valves of the DMD type.

Thus, according to the invention, it is possible to sum up light in a simple manner over a large surface with the use of relatively few light guides, just as it is possible to orient the light emitters of the illumination system relatively freely as the light emitters consist of light guiding ends and not an optical system, drivers and cooling means.

A particularly advantageous embodiment of the invention is obtained with transmissive light valves since they generate few optical losses which may be imperative for the functionality of certain applications.

By letting the apparatus comprise a first lens arrangement, said first lens arrangement comprising at least one microlens arranged with respect to each light valve in such a manner that that the emitted light by the light guide(s) (8) focuses on or in proximity of the optical axis of the individual light valves, it is possible to obtain a high degree of utilization of the light effect and rapid transit times generated by the light source.

By letting the rapid prototyping apparatus comprise a second micro lens arrangement between the light valves and the illumination surface in such a manner that light transmitted through the light channels of the individual light valves is suitably focused on the illumination surface, it is possible to transmit the light from each channel in smaller dots with high intensity on the illumination surface.

The invention also provides a very advantageous possibility of preventing operating errors. Thus, it becomes possible to move the illumination surface as far away as possible from the light valve arrangement which reduces the risk of the media in question coming into contact with the light valve arrangement.

The illumination distance may be determined by the design of the micro lenses.

This property is particularly advantageous as this technique—as opposed to other applications—is technically vulnerable to position inaccuracies in the z surface.

By letting the light guides consist of preferably multi mode fibers, it is possible to obtain a limited loss of illumination intensity and great flexibility in the design by the spacious placing of the individual elements.

By using multi mode fibers it also becomes possible to illuminate the illumination surface with a wide spectrum of light.

By letting at least one on the light sources consist of a short arc gap lamp, a high emitted light effect from an area of a limited physical scope is obtained (high radiation power).

By letting the individual light valves be arranged in rows in the transverse direction of the surface at a given mutual distance, said rows being mutually displaced in the transverse direction, it becomes possible to divide the light linearly and broadly.

By arranging the rows in such a manner that the projection on the transverse direction of the surface provided by the light valves results in a number of illumination points at a given mutual distance in the transverse direction, it becomes possible to emit light in dots with a significantly improved solution than would have been the case if it had been determined by the physical extent of the valves and if placed in one single transverse directional row.

By letting the surface profile(s) of the spatial modulator arrangements be arranged on one or more exposure heads, said exposure heads and said illumination surface being designed to make a relative movement, said rapid prototyping apparatus being provided with a control circuitry for control of the spatial light modulator arrangement in dependency of the movement between the exposure head and the illumination surface, an advantageous embodiment is obtained, according to the invention.

By letting the exposure head(s) comprise a bar whose movement over the illumination surface consists of one single progressing movement in the transverse direction of the bar, it is possible to create illuminated dots covering the entire or a significant part of the illumination surface due to the scanning movement.

By letting the illumination device between the spatial light modulator arrangement and the illumination surface comprise additional optical means for the spreading of light beams provided by spatial light modulator arrangement over the illumination surface, it becomes possible to expose an area which is physically larger than the area covered by the light channels whereby non-active edge areas around a light valve arrangement may also be illuminated.

By letting the spatial light modulator arrangement of the illumination unit be made of spatial light valves such as LCD, PDLC, PLZT,FELCD or Kerr cells, great design flexibility is obtained in relation to the light modulator principle of the individual applications which makes the manufacturing of standardized components cheaper.

By letting the spatial light modulator arrangement of the illumination device consist of reflective electromechanical light valves such as DMD, it is possible to obtain another advantageous embodiment of the invention which is based on commercially wide-spread technologies.

By letting the light valves of the illumination unit consist of transmission-based electromechanical light valves, a solution is obtained with only a small reduction of light through the modulator. This is particular advantageous in relation to even small improvements of the available radiation intensity which results in a significantly reduced duration of illumination. This must be seen in the light of the fact that an RP prototype is made up by several layers of material and the total time to be gained is therefore significant.

By letting the light guides of the illumination unit be arranged with respect to the spatial light modulator arrangement in such a manner that the furnished optical energy for each subset of light modulators does not vary significantly once the subsets of light modulators illuminate adjacent sub-areas in close proximity to each other on the illumination surface, the allowed variation in light intensity between all light sources is obtained and may be increased without being visible.

The invention also relates to a method of the manufacturing of three dimensional objects by means of a rapid prototyping apparatus where at least one light source is optically coupled with a plurality of light guides arranged with respect to the spatial light modulator arrangement in such a manner that each light guide illuminates a sub-area of the cross section.

In this manner, it is possible to obtain an illumination system capable of producing prototypes at a speed which is currently up to 10 time faster than the existing techniques and methods.

The bigger the model, the bigger the advantage according to the invention.

By letting the wholly or partially light-sensitive material be placed as a layer on a plate in a container and subsequently expose it to the RP device before placing a new layer on top of the previous layer, a gradual build-up of the desired prototype is obtained. According to the invention, the method allows for the construction of one layer and joining it with a previous layer in one single work process.

By letting the RP device comprise a computer-aided design program capable of converting the 3D representation of the prototype to be constructed into files containing a cross section of the prototype, the contents of said files being used to control the controllable light modulators, it is possible to convert e.g. graphic representations into a given prototype. This process takes place at a very slow conversion speed, according to the invention.

BRIEF DESCRIPTION OF THE DRAWINGS

The invention will be described in detail in the following with reference to the figures where.

DETAILED DESCRIPTION OF THE PREFERRED EMBODIMENT

Figure 1:
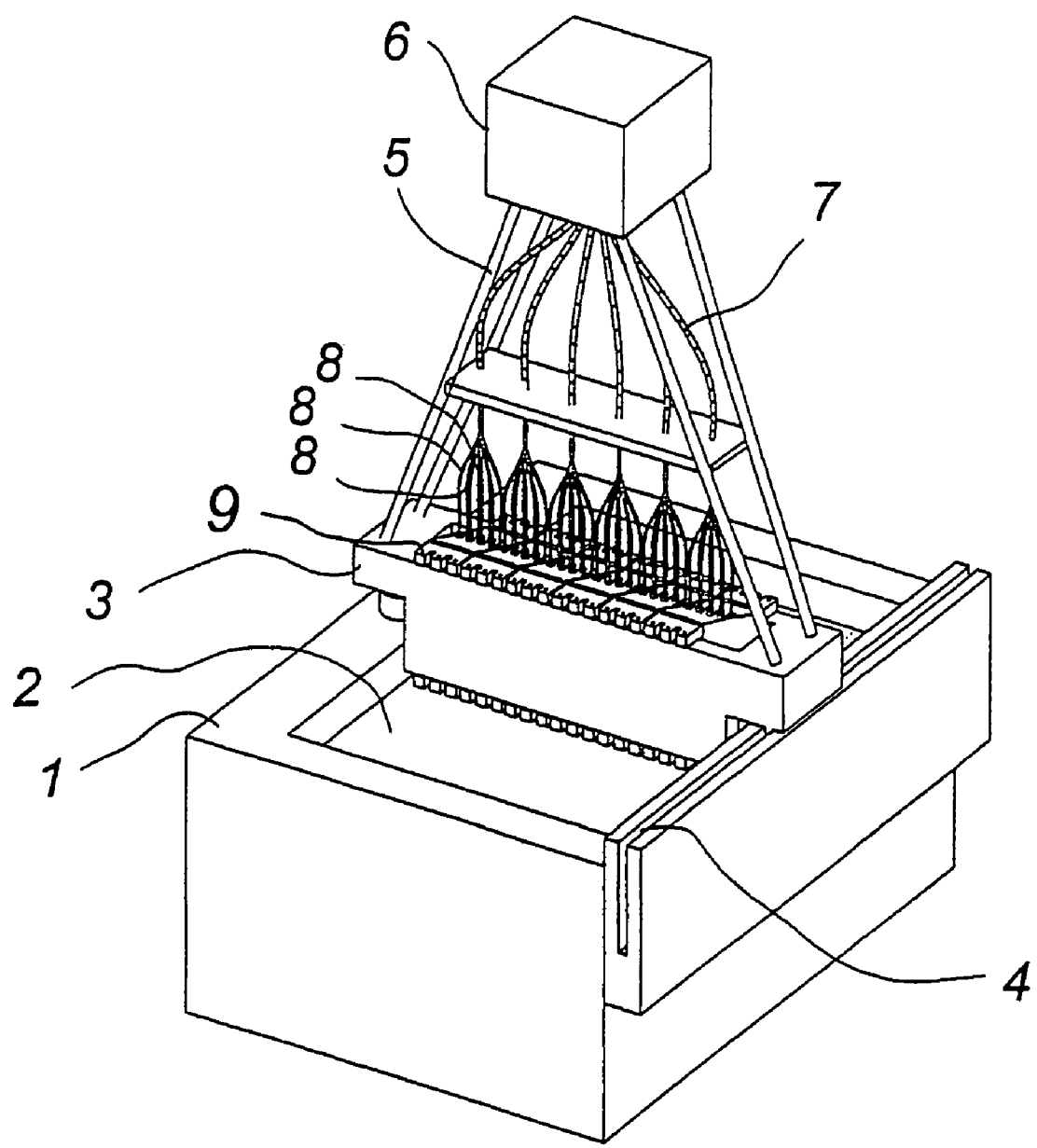
FIG. 1 shows an example of an SLA application according to the invention and FIG. 2 shows an additional example of the SLA application according to the invention.

FIG. 1 shows a schematic diagram of an embodiment according to the invention.

Microshutters or light valves are defined in the broadest sense as transmissive light blinders that may e.g. be made of micromechanical shutters. The individual shutter elements may e.g. be of the type described in the French patent application No. 9412928 or the type described in the corresponding EP-A 709 706 as the preferred embodiment of the invention deems it decisive that the light to be modulated is transmitted directly through the individual microshutters in order to create a minimal loss of transmission.

The shown Rapid Prototyping (RP) apparatus comprises a stationary part whose most significant component consists of a container 1 designed to contain a suitable amount of liquid RP material 2. An RP material is the material of which the RP prototype will be made such as epoxy, acrylates or other RP materials. In addition, the stationary part is designed with a leader 4 which can be positioned for various purposes between the stationary part and a movable illumination device 3. The illumination device may also comprise corresponding leader (not shown) for e.g. a vertical movement. The RP apparatus also comprises other computer-controlled means (not shown) designed to control a relative movement of the illumination device 3 corresponding to a suitable computer-aided design of the illumination system of the RP apparatus.

The illumination device 3 is also provided with an illumination system whose most important components will be described in the following.

The illumination device 3 comprises a light source arrangement 6 mounted on a rack 5 comprising known necessary means of illumination together with a power supply and cooling means. The light source is illustrated as a UV source in the shown example. The light source with its aggregates and cooling means may be stationary or movable.

The light source arrangement 6 is optically connected with bundles 7 of optical multi mode fibers. These bundles 7 spread into eight individual fibers constituting eight light guides 8 where each fiber illuminates a microshutter arrangement of e.g. 588 micromechanical light valves. Thus, in unison, the eight individual fibers illuminate an illumination device 9 comprising eight microshutter arrangements, each constituting an individual area of the entire microshutter arrangement.

The construction itself and the orientation of these light valves have been described in the international application Nos. PCT/DK98/00154 and PCT/DK98/00155 also by the inventor of this invention and are hereby incorporated by reference.

Each individual area comprises a number of light valves that may be individually controlled electrically by a connected control circuitry (not shown). The light valve arrangement may e.g. be an LCD display with a given desired solution. However, micromechanical shutters are preferable.

The entire area of light valves is illuminated by one single light guide 8 arranged in such a manner that a light beam emitted from the light guide 8 may furnish all light valves occupying an individual area with optical energy.

It should be noted that the light beam will usually be furnished through the collimating optics to the sub-areas in such a manner that the light beam with which the spatial light modulator has been furnished is uniform in respect of energy over the modulator area.

The microshutters in the illumination modules 9 have been designed to conduct a scanning over a scanning line of 25 to 30 centimers in the shown illumination arrangement.

It is obvious from the example that the length of the scanning line to be used, i.e. one of the maximum dimensions of a manufactured RP prototype, may be shaped as desired in contrast to existing techniques since the "local" illumination of the individual illumination modules may be oriented in any direction on the illumination surface. Apart from that, it is also immediately obvious that the method of illumination by means of one central light source and the coupled optical guides provides a tremendous advantage in respect of design which is naturally reflected financially and in the quality of the completed construction. The shown construction is thus extremely robust and any defects or damaged light modulators may easily be replaced.

In addition, the apparatus is provided with a control circuitry (not shown) designed to provide a relative Z positioning (vertical movement) and orientation between the illumination system and a material 2. An example of such materials has been described in detail in the example of an embodiment shown in FIG. 2.

Figure 2:
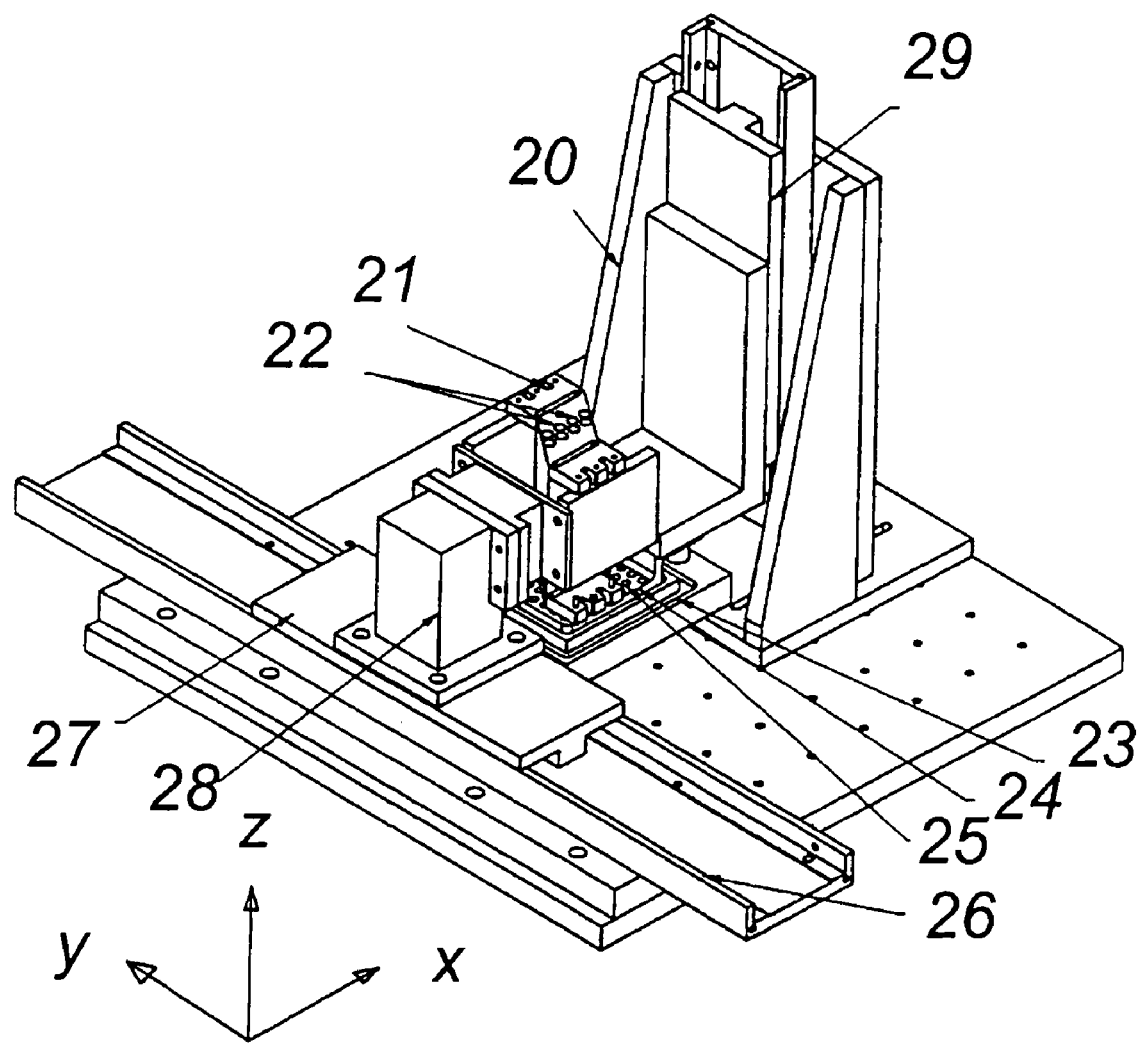

FIG. 2 shows an RP apparatus comprising a stationary part consisting of a rigidly mounted bar provided with a slide 27 moveable on the X and Y plane. Said slide is provided with a holder 28 for fixation of an illumination device, said illumination device being movable horizontally while the device is being fixed vertically.

The illumination device also comprises a light modulator 21 consisting of a number of light valves. The furnishing of light from a light source to the valves is provided for by mounting spots for light fibers 22, the light emitting ends of said light fibers being provided with a connector that makes it easy and simple to create a connection without an actual calibration requirement.

The stationary part of the RP apparatus also comprises an elevator 20 wherein a slide 29 is moving vertically. The slide is mechanically connected to a plate 24 whereby it is possible to move the plate vertically. The plate is submerged into a container 23 designed to contain an suitable amount of liquid RP material and may be contained below the surface.

The container 23 is placed under the illumination device which may be moved over the container horizontally by the slide arrangement 26 to 28 while illuminating the RP material in the suitable manner through the light valves of the illumination device. When illuminated, the exposed amount of RP material will harden from the surface and down to where the plate is submerged. Subsequent to the hardening, the plate is submerged into the liquid material once again and as the plate is provided with a number of perforation holes 23, the submersion may take place quickly while avoiding unnecessary stirring of the material.

Once the plate has been repositioned vertically, it is only submerged so much as to make it possible to create a new layer of liquid RP material on top of the previously hardened layers. An illumination of the new layer is then carried out.

This technique is described in e.g. U.S. Pat. No. 4,575,330 and U.S. Pat. No. 5,174,931, both of which are hereby incorporated by reference.

It is naturally implicit that the container may also be movable and the illumination module stationary in another embodiment or that both units may be movable since a relative movement must take place between the two units. However, in the first embodiment with the movable container, the RP material will most likely be more viscous or solid in order to avoid baffling and the formation of waves.

List of numbers used in the drawings/figures:
1. Container
2. Liquid RP material
3. Illumination device
4. Leader
5. Rack
6. Light source arrangement
7. Bundles of optical fibers
8. Light guides
9. Illumination modules
20. Elevator
21. Illumination module
22. Mounting spots for light emitting ends
23. Container for RP material
24. Plate
25. Perforations in plate
26. Bar
27. Slide for illumination device
28. Holder for illumination device
29. Slide for plate

The invention claimed is:

1. Rapid prototyping apparatus for the manufacturing of three dimensional objects by additive treatment of cross sections comprising a wholly or partially light-sensitive material, said apparatus comprising at least one light source for illumination of a cross section of the light-sensitive material by at least two spatial light modulators of individually controllable light modulators, wherein the at least one light source is optically coupled to a plurality of light guides arranged with respect to the spatial light modulator arrangement in such a manner that each light guide illuminates a sub-area of the cross section.

2. Rapid prototyping apparatus of claim 1 wherein each spatial modulator arrangement comprises transmissive light valves.

3. Rapid prototyping apparatus of claim 2 wherein said apparatus comprises a first lens arrangement, said first lens arrangement comprising at least one micro lens arranged with respect to each light valve in such a manner that that the emitted light by the light guide focuses on or in proximity of the optical axis of the individual light valves.

4. Rapid prototyping apparatus of claim 2 further comprising a second lens arrangement, said second lens arrangement comprising at least one micro lens arranged between the light valves and an illumination surface in such a manner that light transmitted through channels of the individual light valves is suitably focused on the illumination surface.

5. Rapid prototyping apparatus of claim 1 wherein optical fibers constitute the optical light guides.

6. Rapid prototyping apparatus of claim 1 wherein the at least one light sources is made of a short arc gap lamp.

7. Rapid prototyping apparatus of claim 2 wherein the individual light valves are arranged in rows in a transverse direction of a surface at a given mutual distance, said rows being mutually displaced in the transverse direction.

8. Rapid prototyping apparatus of claim 7 wherein the rows are arranged in such a manner that the projection of each individual light valve in the transverse direction on the surface results in a number of illumination points at a given mutual distance in the transverse direction.

9. Rapid prototyping apparatus of claim 1 wherein surface profiles of the spatial modulator arrangements are arranged on one or more exposure heads, said exposure heads and an illumination surface being designed to make a relative movement, said rapid prototyping apparatus being provided with a control circuitry for control of the spatial light modulator arrangements in dependency of the movement between the exposure head and the illumination surface.

10. Rapid prototype apparatus of claim 1 further comprising an exposure head comprising a bar whose relative movement over an illumination surface consists of one single progressing movement in a transverse direction of the bar.

11. Rapid prototyping apparatus of claim 1 further comprising an illumination device between the spatial light modulator arrangement and an illumination surface comprising optical means for spreading light beams emitted by the light modulator arrangement over the illumination surface.

12. Rapid prototyping apparatus according to claim 1 wherein the modulator arrangement comprises the spatial light modulators including at least one of LCD, PDLC, PLZT, FELCD and Kerr cells.

13. Rapid prototyping apparatus of claim 1 wherein the modulator arrangement comprises reflective electromechanical light valves.

14. Rapid prototyping apparatus of claim 13 wherein the light guides are arranged with respect to the modulator arrangement in such a manner that optical energy furnished to each subset of light valves does not vary significantly once the subsets of light valves illuminate adjacent sub-areas in close proximity to each other on an illumination surface.

15. Method of manufacturing three dimensional objects by means of a rapid prototyping apparatus where a wholly or partially light-sensitive material is treated by at least one light source illuminating a cross section of the material by at least two modulator arrangements of individually controllable light modulators, wherein at least one light source is optically coupled with a plurality of light guides arranged with respect to the spatial light modulator arrangement in such a manner that each light guide illuminates a sub-area of the cross section.

16. Method of claim 15 wherein a wholly or partially light-sensitive material is placed in a layer on a plate in a container and subsequently exposed to an RP apparatus prior to creating a new layer on top of the previous layer.

17. Method of claim 15 wherein an RP apparatus is provided with a computer-aided design program wherein a 3D representation of the desired prototype is converted into files containing a cross section of the prototype and wherein the contents of the files are used to control the spatial light modulator arrangement.

18. Rapid prototyping apparatus of claim 5 wherein said optical fibers are multi mode fibers.

19. Rapid prototyping apparatus of claim 13 wherein said reflective electromechanical light valves comprise DMD.

20. Rapid prototyping apparatus of claim 1, wherein the plurality of light guides is disposed between the light source and the spatial light modulators.

21. Rapid prototyping apparatus for the manufacturing of three dimensional objects by additive treatment of cross sections comprising a wholly or partially light-sensitive material, said apparatus comprising at least one light source for illumination of a cross section of the light-sensitive material by at least one spatial light modulator of individually controllable light modulators, wherein the at least one light source is optically coupled to a plurality of light guides arranged with respect to the spatial light modulator arrangement in such a manner that each light guide illuminates a sub-area of the cross section, wherein the plurality of light guides is disposed between the light source and the spatial light modulators.

* * * * *